United States Patent
Burghardt

(10) Patent No.: US 7,390,022 B2
(45) Date of Patent: Jun. 24, 2008

(54) INTEGRATED SEAT BELT SHOULDER ANCHOR

(75) Inventor: Ross L. Burghardt, San Antonio, TX (US)

(73) Assignee: TK Holdings Inc., Auburn Hills, MI (US)

( * ) Notice: Subject to any disclaimer, the term of this patent is extended or adjusted under 35 U.S.C. 154(b) by 18 days.

(21) Appl. No.: 11/498,812

(22) Filed: Aug. 4, 2006

(65) Prior Publication Data

US 2008/0030013 A1    Feb. 7, 2008

(51) Int. Cl.
*B60R 22/18* (2006.01)

(52) U.S. Cl. .................................................... 280/808

(58) Field of Classification Search ............... 280/808, 280/801.1; 297/468; *B60R 22/18, 22/24*
See application file for complete search history.

(56) References Cited

U.S. PATENT DOCUMENTS

| 5,280,859 | A   |   | 1/1994  | Nanbu |
| 5,372,382 | A   | * | 12/1994 | Whitens .................... 280/808 |
| 6,120,061 | A   | * | 9/2000  | Ito .......................... 280/808 |
| 6,138,328 | A   | * | 10/2000 | Iseki ......................... 24/197 |
| 6,315,328 | B1  |   | 11/2001 | Iseki et al. |
| 6,467,850 | B1  | * | 10/2002 | Kawai et al. ................ 297/468 |
| 6,491,347 | B2  | * | 12/2002 | Iseki ....................... 297/463.1 |
| 6,715,793 | B2  | * | 4/2004  | Okubo ...................... 280/808 |
| 6,726,287 | B1  | * | 4/2004  | Janz .......................... 297/483 |

* cited by examiner

*Primary Examiner*—Anne Marie Boehler
*Assistant Examiner*—Robert A. Coker
(74) *Attorney, Agent, or Firm*—Foley & Lardner LLP

(57) ABSTRACT

A seat belt assembly for use in a vehicle seat includes a shoulder anchor for guiding a seat belt having a turn flange with a flat portion and a curved portion.

20 Claims, 4 Drawing Sheets

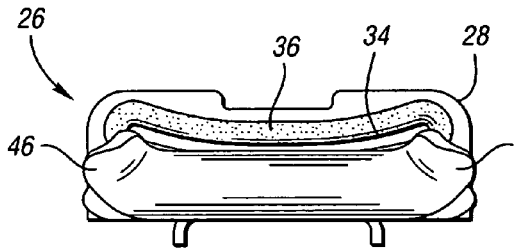
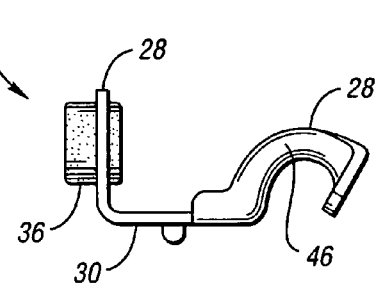
Fig. 4          Fig. 5
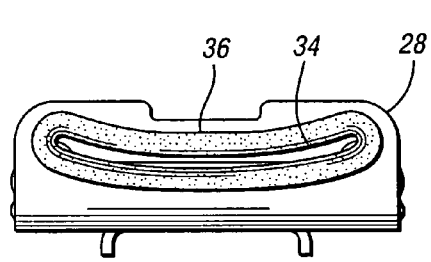
Fig. 6
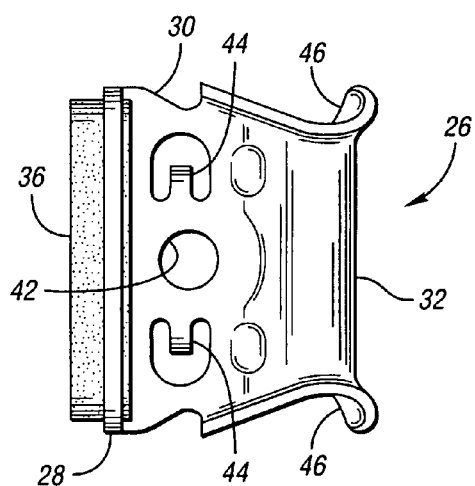
Fig. 8
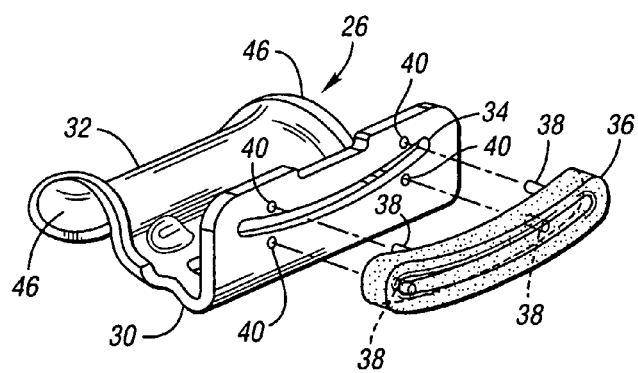
Fig. 9

INTEGRATED SEAT BELT SHOULDER ANCHOR

BACKGROUND

The present invention relates generally to the field of seat belt assemblies. More specifically, the present invention relates to the field of shoulder anchors for use with seat belt assemblies in motor vehicles.

Contemporary passenger vehicles include seat belt assemblies for protecting vehicle passengers during vehicle collision or rapid deceleration of the vehicle. The seat belt is anchored to the vehicle frame. Most vehicles include a floor frame and at least two structural pillars (e.g., an 'A' pillar supporting the vehicle windshield and a 'B', 'C' and/or 'D' pillar partially defining the passenger compartment of the vehicle. Some seat belt assemblies are three-point arrangements having three structural anchors. The seat belt may be attached (indirectly) to the vehicle body via the buckle and retractor, which are separately coupled to the vehicle floor frame, and the shoulder anchor, which is coupled to any one of the B, C and/or D pillars. In some arrangements, the shoulder anchor may also be mounted to the upper portion of the vehicle seat. The seat belt is configured to extend across the passenger's lap and upper body portion in the three-point arrangement.

Most vehicle owners engage in a substantial amount of egress and ingress with respect to the vehicle. Therefore, any resistance to winding and unwinding the seat belt can lead to user discomfort or dissatisfaction. However, given the packaging demands of many passenger vehicles and/or seats there is little room to allow for turning the seat belt and providing a guide portion for the belt. For example, in belt-to-seat arrangements, in which the belt is coupled to the seat, there is limited room for turning the seat belt and providing a guide portion for the belt. Some designs include the use of mechanical rollers to route the belt and reduce the force required to retract and extract the seat belt. However, such rollers can be expensive and substantially increase the overall cost of the seat belt assembly.

Therefore, it is desirable to provide a seat belt assembly with a shoulder anchor that complies with limited packaging demands and reduces the resistance of the seat belt during retraction and extraction without requiring additional parts.

SUMMARY

In one exemplary embodiment, a shoulder anchor for guiding a seat belt configured to restrain an occupant of a vehicle comprises a single anchor body that includes: a belt guide. The belt guide includes a slot at one end of the anchor body. The slot is configured to allow the seatbelt to pass there through. A mounting portion is configured to be connected to the vehicle and a turn flange is located at another end of the anchor body and includes a curved surface configured to receive the seat belt. The turn flange further includes a flared portion extending from the curved surface configured to laterally guide the belt with respect to the turn flange.

In another exemplary embodiment, a vehicle seat belt assembly comprises a seat belt configured to restrain an occupant of a vehicle; a retractor configured to selectively wind the seat belt; and a shoulder anchor that includes a belt guide having a slot at one end of the anchor body, the slot configured to allow the seatbelt to pass there through; a mounting portion configured to be connected to the vehicle; and a turn flange located at another end of the anchor body which includes a curved surface configured to receive the seat belt. The turn flange further includes a flared portion extending from the curved surface configured to laterally guide the belt with respect to the turn flange.

In another exemplary embodiment, a shoulder anchor for guiding a seat belt configured to restrain an occupant of a vehicle comprises a single anchor body that includes: a belt guide having a slot at one end of the anchor body, the slot configured to allow the seatbelt to pass there through, a mounting portion configured to be connected to the vehicle; and a turn flange located at another end of the anchor body and includes a curved surface configured to receive the seat belt. The turn flange further includes a flared portion extending from the curved surface configured to laterally guide the belt with respect to the turn flange. The mounting portion is located between the belt guide and the turn flange. The belt guide extends generally perpendicularly from the mounting portion.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 4 is a schematic depiction of a side view of a shoulder anchor assembly according to an exemplary embodiment.

FIG. 5 is a schematic depiction of a side view of a shoulder anchor assembly according to an exemplary embodiment.

FIG. 6 is a schematic depiction of a side view of a shoulder anchor assembly according to an exemplary embodiment.

FIG. 8 is a schematic depiction of a side view of a shoulder anchor assembly according to an exemplary embodiment.

FIG. 9 is a schematic depiction of a shoulder anchor assembly that includes mating protrusions according to an exemplary embodiment.

DETAILED DESCRIPTION

Figure 1:
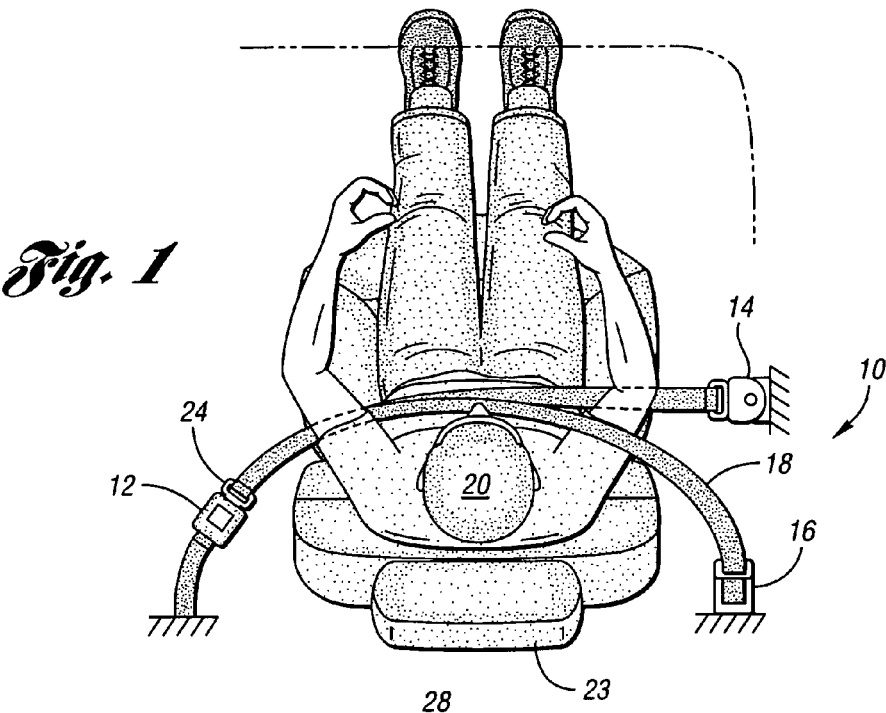
FIG. 1 is a schematic depiction of a seatbelt apparatus according to an exemplary embodiment.
Figure 2:
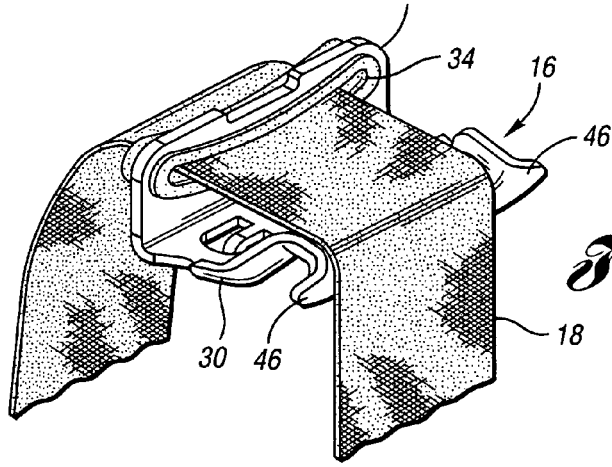
FIG. 2 is a schematic depiction of a shoulder anchor assembly according to an exemplary embodiment.

Referring to FIGS. 1-10, a seat belt assembly 10 is provided for use in a motor vehicle. In FIG. 1, the seat belt assembly 10 is a three-point assembly having a buckle 12, floor anchor 14 and shoulder anchor 16. The belt 18 (or webbing) is laced through the components of the belt assembly to selectively extend across the vehicle occupant 20 and restrain the occupant to the vehicle seat in the event of rapid acceleration or deceleration of the vehicle. In one exemplary embodiment, the seat belt assembly 10 includes a retractor 22 coupled to the floor anchor and configured to apply tension to the seat belt 18. The retractor 22 may be a single stage retractor configured to apply tension to the belt when in the buckled state or multi stage retractor configured to apply various levels of tension to the belt 18 when in the buckled and unbuckled states.

The belt 18 is attached to a tongue 24 which engages with the buckle 12 of the seat belt assembly 10. The tongue 24 includes a striker portion and a tongue housing. The buckle includes a buckle housing and latch nested therein. The latch is configured to attach the striker portion of the tongue inside the buckle housing. The belt 18 may be composed of a plurality of differently materials including polyester and other natural or synthetic fibers.

Figure 3:
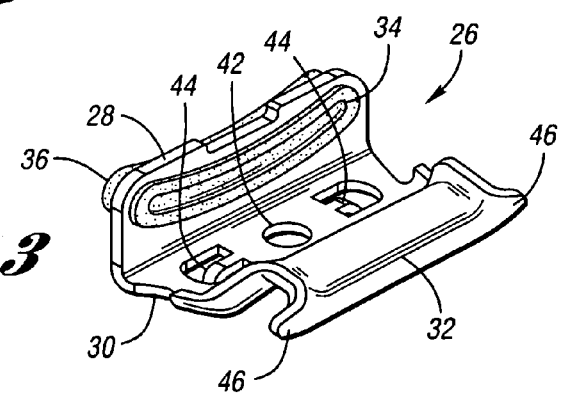
FIG. 3 is a schematic depiction of a shoulder anchor assembly according to an exemplary embodiment.

A shoulder anchor 16 is included with the seat belt assembly 10 as shown in the illustrative exemplary embodiments of FIGS. 2-10. The shoulder anchor 16 is configured to guide the belt 18 across the upper portion of the occupant 20. The shoulder anchor 16 is mounted upward the buckle 12 and floor anchor 14 of the seat belt assembly 10. In one exemplary embodiment, the shoulder anchor 16 is coupled to the B-pillar, 'B', of the vehicle frame. In another embodiment, the shoulder anchor 16 is mounted to an upper portion of the vehicle seat. The shoulder anchor 16 includes an anchor body 26 having a belt guide 28, mounting surface 30 and turn flange 32, as shown in FIG. 3. The belt 18 typically includes webbing material, but may be formed from a non-webbing type material as well.

The belt or webbing guide 28 extends substantially perpendicularly from the mounting surface 30 of the shoulder anchor 16. Defined within the belt guide 28 is a slot 34 extending laterally across the face of the belt guide 28, as shown in FIG. 6. The slot 34 is configured to enable the belt 18 to pass through the belt guide 28 with minimal resistance. The slot 34 has two ends with slight curvature at each end. The shape of the slot 34 facilitates smooth passage of the belt webbing therethrough. The slot 34 may also be flat with respect to the belt guide 28. In one embodiment, the belt guide 28 includes a resin liner 36 which fits on the inner portion of the slot 34. The resin liner 36 provides a smooth surface to interface with the belt 18 thereby reducing wear on the belt when in use. In one embodiment, the resin liner 36 is composed of a hard foam. In another embodiment, the resin liner 36 may be composed of a polymer or plastic type material or other suitable material that would reduce friction between the belt guide and the belt webbing. According to one exemplary embodiment, the resin liner 36 is insert molded into the shoulder anchor 16. In another exemplary embodiment, the resin liner 36 includes series of protrusions 38, as shown in FIG. 9. The belt guide 28 includes apertures 40 through which the protrusions 38 are fittable. The mating protrusions 38 and apertures 40 reinforce the connection between the liner 36 and the belt guide 28 even as the dimensions of the resin liner alter upon cooling. Therefore, the mating protrusions 38 aid in the molding process of the resin liner 36 as the protrusions 38 provide greater system stability to the belt guide 28.

Figure 7:
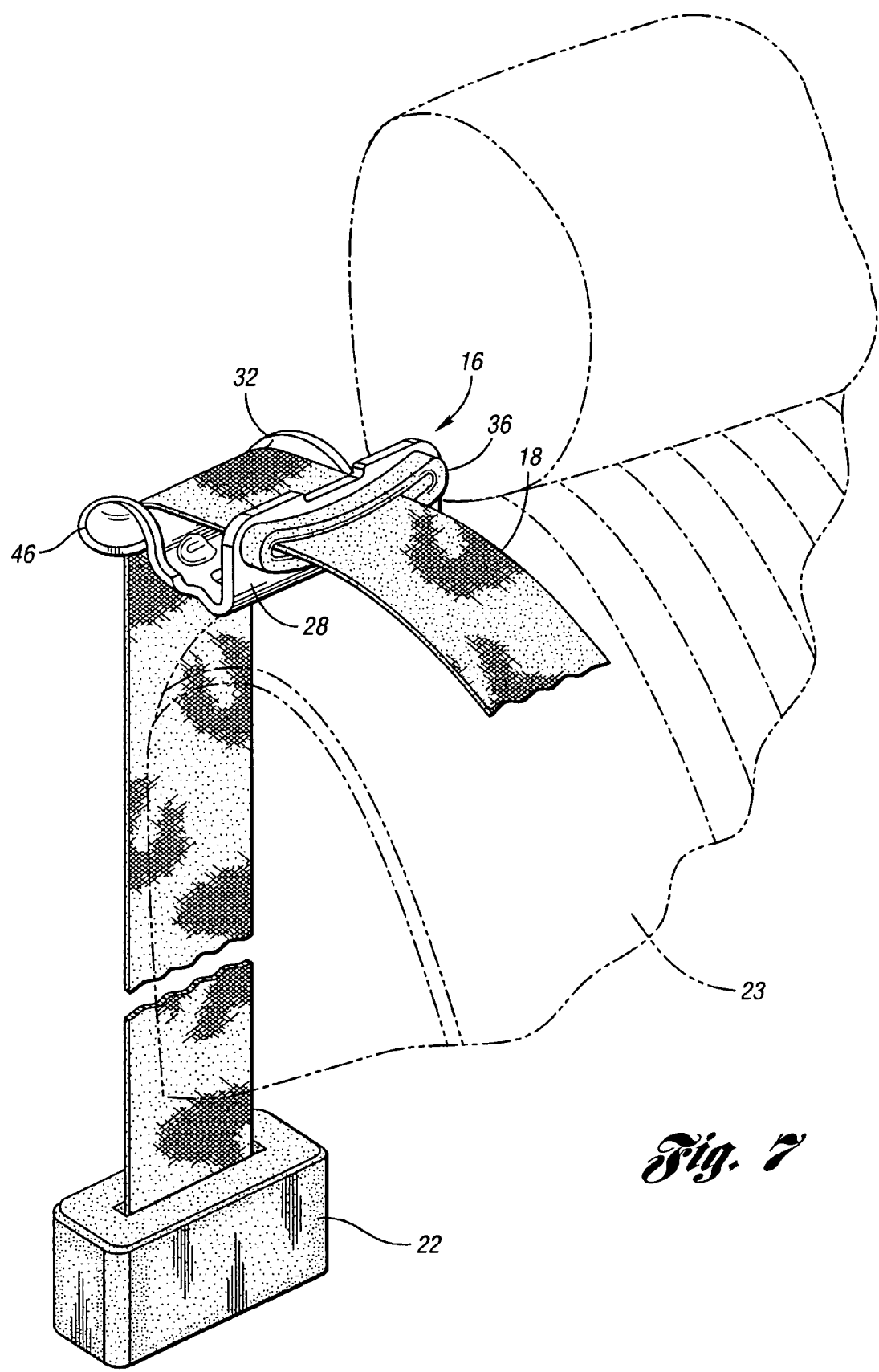
FIG. 7 is a schematic depiction of a shoulder anchor assembly mounted to a vehicle seat according to an exemplary embodiment.

Adjacent the belt guide 28 is a mounting surface 30. The mounting surface 30 is configured to couple to the vehicle seat 23, as shown in FIG. 7. In the illustrated embodiment, the mounting surface 30 includes an aperture 42 for securing a fastener there through. The fastener may be a bolt or any other mechanical fastener. The mounting surface 30 includes anti-rotation tabs 44 biased upward with respect to the mounting surface. The tabs 44 further guide the belt 18 with respect to the belt guide 28 to ensure that the belt remains substantially perpendicular with respect to the slot 34 as it passes there through.

Adjacent the mounting surface 30 is a turn flange 32. The turn flange 32 is configured to guide the belt 18 downward with respect to the shoulder anchor 16. The radius of curvature of the turn flange 32 is approximately 90 degrees with respect to the mounting surface 30 of the shoulder anchor 16. On the outer periphery of the turn flange 32 includes a flared surface 46 extending from the turn flange 32. The flared surface 46 is curved outward with respect to the turn flange 32. The flared surface 46 substantially reduces the friction on the edges of the belt 18 as it passes through the turn flange 32. Therefore, extending the seat belt 18 requires less effort from the vehicle occupant.

In one exemplary embodiment, the shoulder anchor 16 is manufactured via a three step process. The shoulder anchor 16 is stamped out from a piece of sheet metal. The belt guide 28 is bent with respect to the mounting surface 30. Next, the turn flange 32 is bent with respect to the mounting surface 30. The turn flange 32 may be cold rolled or bent using any metal fabricating procedure known within the field. In one exemplary embodiment, the shoulder anchor 16 is composed of a ferrous material.

In one exemplary embodiment, the turn flange 32 is coated with a surface platting. The surface platting reduces the friction between the belt and the turn flange. The surface platting includes a NiCr material.

According to an embodiment, the anchor body 26 is at least 2.4 mm thick.

In another embodiment, the mounting surface 30 is configured to coupled to the vehicle frame. The seat belt assembly 10 may be utilized in a number of various automobiles including sedans, tucks, vans, SUVs, passenger vehicles, and other transportation devices. In such embodiments, the shoulder anchor 16 may be affixed to the C- or D-pillars of the vehicle. Though the illustrative exemplary embodiment of FIG. 1 shows a three-point belt assembly the seat belt assembly may be two point belt assembly as well.

Figure 10:
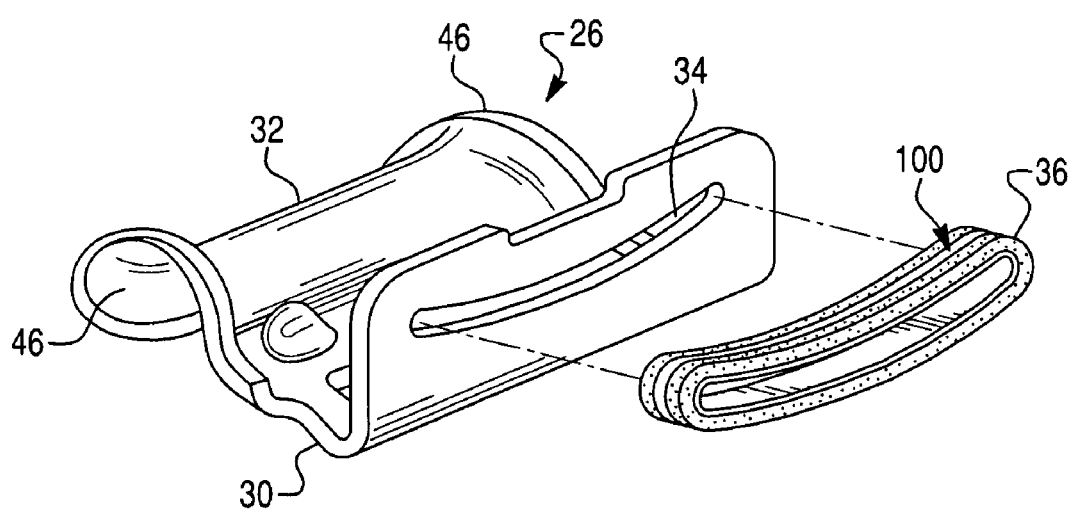
FIG. 10 is a schematic exploded view of a shoulder anchor assembly according to an exemplary embodiment.

FIG. 10 shows an exploded view of an exemplary embodiment that includes an anchor body 26 and a resin liner 36. As shown in FIG. 10, the resin liner 36 can include a groove 100. The groove 100 of the resin liner 36 can be configured to mate with the anchor body 26.

While the exemplary embodiments illustrated in the FIGS. and described above are presently preferred, it should be understood that these embodiments are offered by way of example only. For example, the teachings herein can be applied to any anchor and is not limited to a shoulder anchor for a three-point belt assembly.

What is claimed is:

1. A shoulder anchor for guiding a seat belt webbing configured to restrain an occupant of a vehicle, comprising:
    a single anchor body including a belt guide, a mounting portion and a turn flange;
    wherein the belt guide includes a slot at one end of the anchor body, the slot configured to allow the seatbelt to pass there through;
    wherein the mounting portion is configured to be connected to the vehicle; and
    wherein the turn flange is located at another end of the anchor body and includes a curved surface configured to receive the seat belt, and wherein the turn flange further includes a flared portion extending from the curved surface configured to laterally guide the belt with respect to the turn flange.

2. The shoulder anchor of claim 1, further comprising a resin liner at least partially covering the surface of the slot.

3. The shoulder anchor of claim 2, wherein the resin liner includes a groove that mates with the anchor body.

4. The shoulder anchor of claim 2, further comprising:
    at least one aperture in the belt guide; and wherein the resin liner includes at least one protrusion configured to fit in the at least one aperture, thereby further securing the resin liner to the shoulder anchor.

5. The shoulder anchor of claim 1, wherein the mounting portion includes a tab configured to prevent rotation of the anchor body when the anchor body is attached to the vehicle.

6. The shoulder anchor of claim 1, wherein a surface of the turn flange is plated with a material that is configured to reduce the friction between the seat belt and the turn guide.

7. The shoulder anchor of claim 6, wherein the plating material includes a nickel-chrome alloy.

8. A vehicle seat belt assembly, comprising:
a seat belt configured to restrain an occupant of a vehicle;
a retractor configured to selectively wind the seat belt; and
a shoulder anchor including a belt guide, a mounting portion and a turn flange;
wherein the belt guide includes a slot at one end of the anchor body, the slot configured to allow the seatbelt to pass there through; wherein the mounting portion is configured to be connected to the vehicle; and wherein the turn flange is located at another end of the anchor body and includes a curved surface configured to receive the seat belt, wherein the turn flange further includes a flared portion extending from the curved surface configured to laterally guide the belt with respect to the turn flange.

9. The seat belt assembly of claim 8, further comprising a resin liner at least partially covering the surface of the slot.

10. The seat belt assembly of claim 9, wherein the resin liner includes a groove that mates with the anchor body.

11. The seat belt assembly of claim 9, further comprising:
at least one aperture in the belt guide; and
wherein the resin liner includes at least one protrusion configured to fit in the at least one aperture, thereby further securing the resin liner to the shoulder anchor.

12. The seat belt assembly of claim 8, wherein the mounting portion includes a tab configured to prevent rotation of the anchor body when the anchor body is attached to the vehicle.

13. The seat belt assembly of claim 8, wherein a surface of the turn flange is plated with a material that is configured to reduce the friction between the seat belt and the turn guide.

14. The seat belt assembly of claim 13, wherein the plating material includes a nickel-chrome alloy.

15. A shoulder anchor for guiding a seat belt configured to restrain an occupant of a vehicle, comprising:
a single anchor body including a belt guide, a mounting portion and a turn flange;
wherein the belt guide includes a slot at one end of the anchor body, the slot configured to allow the seatbelt to pass there through;
wherein the mounting portion is configured to be connected to the vehicle; and
wherein the turn flange is located at another end of the anchor body and includes a curved surface configured to receive the seat belt, wherein the turn flange further includes a flared portion extending from the curved surface configured to laterally guide the belt with respect to the turn flange;
wherein the mounting portion is located between the belt guide and the turn flange;
wherein the belt guide extends generally perpendicularly from the mounting portion.

16. The shoulder anchor of claim 15, further comprising a resin liner at least partially covering the surface of the slot; and wherein the resin liner includes a groove that mates with the anchor body.

17. The shoulder anchor of claim 16, further comprising: at least one aperture in the belt guide; and wherein the resin liner includes at least one protrusion fittable in the at least one aperture, thereby further securing the resin liner to the shoulder anchor.

18. The shoulder anchor of claim 15, wherein the anchor body is at least 2.4 mm thick.

19. The shoulder anchor of claim 15, wherein the mounting portion includes a tab configured to prevent rotation of the anchor body when the anchor body is attached to the vehicle.

20. The shoulder anchor of claim 15, wherein a surface of the turn flange is plated with a material that is configured to reduce the friction between the seat belt and the turn guide.

* * * * *